United States Patent [19]

Allison et al.

[11] Patent Number: 4,890,093
[45] Date of Patent: Dec. 26, 1989

[54] SOLAR POWERED PROXIMITY TRIGGERED LIGHT

[75] Inventors: James R. Allison, Mill Valley; Garry J. Bolin, Danville, both of Calif.

[73] Assignee: Schlage Lock Company, San Francisco, Calif.

[21] Appl. No.: 263,238

[22] Filed: Oct. 27, 1988

[51] Int. Cl.⁴ ............................................. G01D 21/04
[52] U.S. Cl. .................................. 340/567; 340/565; 362/431; 307/117
[58] Field of Search ............... 340/552, 555, 556, 565, 340/567; 250/339, 340, 345, 353; 307/117; 362/431

[56] References Cited

U.S. PATENT DOCUMENTS

| | | | |
|---|---|---|---|
| 4,200,904 | 4/1980 | Doan | 362/431 |
| 4,342,987 | 8/1982 | Rossin | 340/565 |
| 4,568,868 | 2/1986 | Schlepp | 307/117 |

Primary Examiner—Michael J. Tokar
Attorney, Agent, or Firm—Walter C. Vliet

[57] ABSTRACT

Disclosed is a self-contained Solar Powered Proximity Security Device which operates both local devices, such as lamps, and remote devices through its internal encoder/transmitter. In its automatic mode the device may be operated and triggered by its own internal motion detector or from other local external devices connected to it, or by any combination of internal or external detection devices or switches. Response may be further conditioned by detected ambient or other conditions. For example, the light may not turn on during daylight hours or under conditions of low battery charge to conserve power for priority functions.

8 Claims, 1 Drawing Sheet

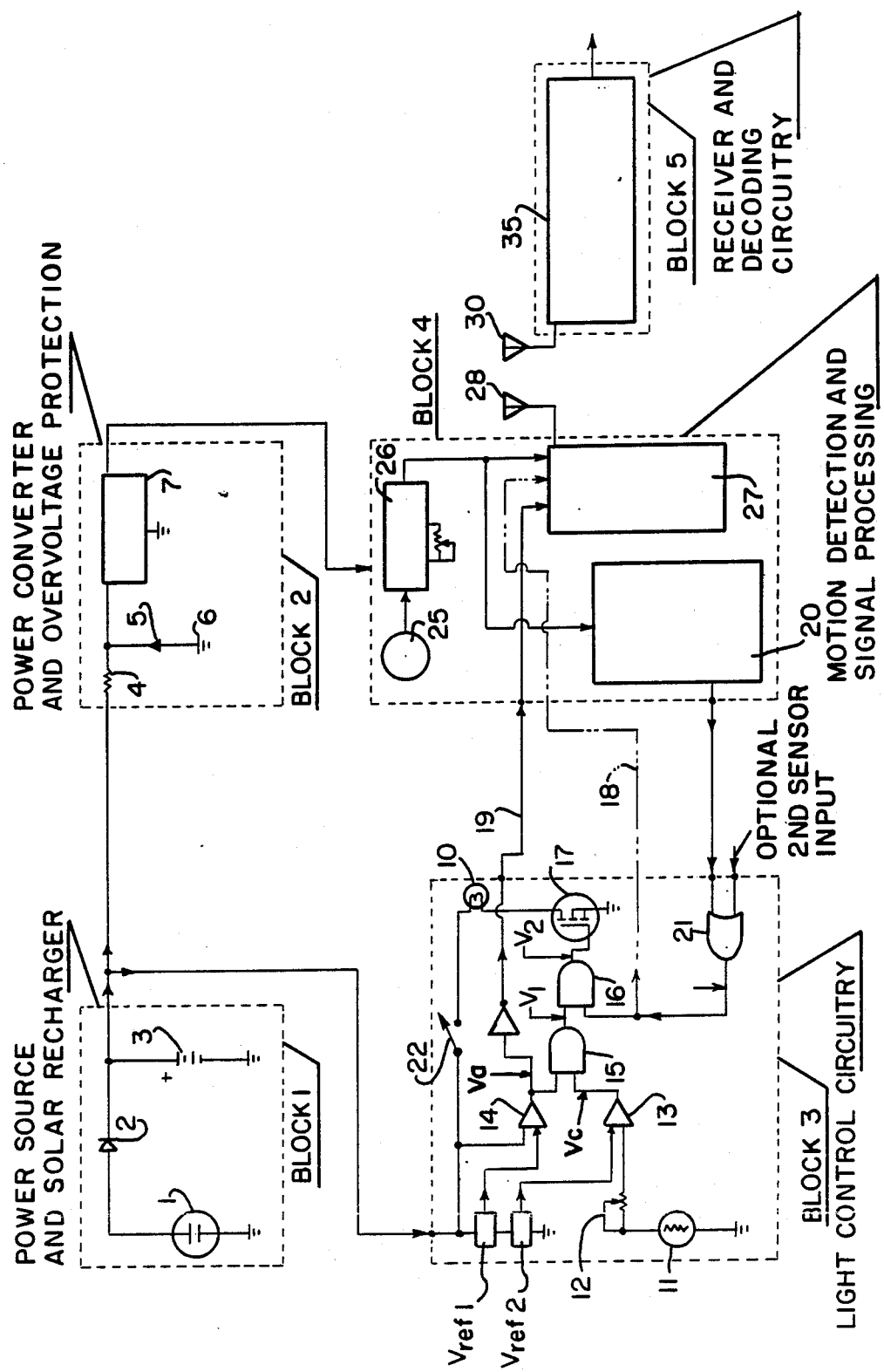

SOLAR POWERED PROXIMITY TRIGGERED LIGHT

BACKGROUND OF THE INVENTION

This invention pertains to self-standing solar powered security lighting and signal devices. In the past, temporary and/or remote lighting requirements have required the installation of either temporary wire situations with their attendant potential for damage and/or shock or fire hazard. In recent years a number of attempts have been made to produce self-standing lighting units which are solar operated and may or may not incorporate a storage device for extended nighttime use. The present invention addresses the problem of a free standing security light and signalling device without the requirement of remote wiring.

OBJECT OF THE INVENTION

The object of the invention is to provide a solar powered proximity sensing security device which is totally self-contained. A further object of the invention is to provide a device which conserves power, is ambient condition responsive, convenient to install and use, and is of economical and rugged design. These and other objects are obtained in a solar powered proximity security device comprising: a means for receiving and storing solar power; security means operated by said source of securing and storing power; motion sensing means for initiating response of said security device in response to an established need; and control means operative in response to a predetermined ambient condition to initiate operation of said security device.

BRIEF DESCRIPTION OF THE DRAWINGS

FIG. 1 is an electrical schematic drawing of a solar powered security device according to the present invention.

DESCRIPTION OF THE PREFERRED EMBODIMENT

The solar powered proximity security device according to the present invention is a totally self-contained solar powered detection system which can operate both local devices including lamps, etc., and remote devices through its internal encoder/transmitter.

In the automatic mode the device may be operated and triggered by its own internal motion detector or from other local external devices connected to it. Such as, for example, a trip wire or by any combination of internal and/or external detection devices or switches.

The motion detection/transmitting functions operate day and night. However, the built-in area light only operates at night and only when it senses motion in its illuminated area. The area lamp will stay lit for a period of time after the unit stops detecting motion within its local area. The unit also transmits a signal whenever it senses activity within its control area. This may be utilized to initiate response of a remote security system signalling the presence of someone in the lighted area. If the devices had not had enough sunlight to charge the storage battery sufficiently to operate the high current lamp, an internal circuit will prevent the lamp from operating until the battery has received sufficient charge. This action provides maximum battery life and minimum recharging time. It should be noted that during this mode of operation, the motion detector and transmitters will continue to function for an extended period of time due to their low power drain requirements and the elimination of a high load which conserves the remaining battery power.

Referring to FIG. 1 a simplified electric schematic diagram of the system is provided. The system consists basically of five operational blocks:
 1. Power Source and Solar Recharger
 2. Power Converter and Protection Circuitry
 3. Light Control Circuitry
 4. Motion Detection and Signal Processing Circuitry
 5. Receiving and Decoding Circuitry A brief description of each operational block follows.

Block 1 shown in dotted line shows the power collection and retention system which consists of a solar cell indicated by the reference numeral 1 which collects solar power and delivers it through an isolation diode 2 to the remainder of the circuit and a rechargeable battery 3. Thus the solar cell collects solar energy and delivers it to the system and/or alternatively the rechargeable battery for storage.

Block 2 shows the necessary circuitry for converting the solar power and/or battery power to the appropriate voltage necessary to operate the analog and digital circuits within the remainder of the unit. The power converter and overvoltage protection circuitry comprises the following for purposes of the preferred embodiment herein described.

Resistor-zener diode shunt regulator including a resistor 4, and a zener diode 5 connected to ground 6. The resistor-zener diode shunt regulator protects the integrated circuit type dc to dc converter 7 from high voltages produced by the solar cell under high light conditions. The dc to dc converter converts the available voltage to voltage in the range of 10 to 18 volts to supply power necessary to the motion detection circuits contained in Block 4.

Block 3 contains the area light 10 and several important functional components. Included in Block 3 is circuity which detects the absence of ambient light comprising an ambient light sensor 11, which has its output level adjusted by a variable resistor 12, to a low light detector 13, wherein the ambient light sensor output is compared against a reference voltage V, Ref. 2, to produce an output voltage upon the ambient light sensor sensing darkness and reducing its voltage output. The low light detector 13 switches its output (Vc) to a logic "1" when it is dark enough. This output is "AND-ed" with the output of the low battery detector 14 whose output (Va) is at a logic "1" when the battery voltage is greater than the recommended discharge voltage V Ref. 1. If both conditions are met i.e., it is dark enough and the battery voltage is greater than the recommended discharge voltage the output of the first AND gate (AND 1) 15 ($V_1$) is also at a logic "1" and is presented to one input of the second AND gate (AND 2) 16. If an "alarm" occurs, ($V_1=1$), then the output of the second AND gate goes to a logic "1" ($V_2=1$) which turns on the output of the transistor 17 and hence the area light 10 provided the on/off switch 22 is in the on position. The light is held on for the duration of the activity gate 20 located in Block 4 which in the preferred embodiment is adjusted for about 15 to 20 seconds after the motion detector signals stopping of activity in the area.

If desired another signal may be brought out of this section. This signal is shown as the low battery signal 19 and should be used to transmit an encoded signal to the receiver representing a low battery alarm. This would indicate that the battery is so low that the motion detector and transmitter circuits may soon malfunction and corrective action should be initiated. A further optional motion trigger signal 18 may be utilized to trigger a remote security device, for example using the output of gate 21, as an enable signal, to trigger a remote alarm through the transient circuits 27.

Block 4 contains three main circuit components including the motion detector 25 and its signal processing circuits 26, the transmitter 27 and its encoder, having output on an antenna 28 and the activity gate generator 20. When motion is detected the circuitry generator generates a trigger which briefly turns on the transmitter 27 and at the same time turns on the activity gate generator 20. The activity gate generator 20 in turn will turn on the area light if the ambient light level and the battery voltage is all right as mentioned in the description of Block 3 components. The motion gate signal may be fed into either an AND gate or an OR gate 21 if an external signal is to be used. The AND gate configuration requires the activation of two different sensors in order to turn on the light. The OR gate configuration will operate the light if either sensor is activated.

The remaining Block 5 includes the receiving and decoding circuitry received from antenna 28 by antenna 30. The receiving and decoding circuitry 35 processes the signal of the encoder and transmitter circuit 27 to accomplish further alarm or security function. The receiving and decoding circuitry may be of the type found in the Schlage "KeepSafer" Electronic Security Systems offered for sale by Schlage Lock Company of San Francisco, Calif. This system operates in response to radio frequency signals generated by local detectors. The receiving and decoding circuitry 35 allows a remote alarm response in response to the solar powered proximity security device of the present invention sensing motion in its area.

Having described our invention in terms of a preferred embodiment, numerous modifications will now occur to one skilled in the art, and we do not wish to be limited in the scope of our invention except as claimed.

We claim:

1. A solar powered proximity triggered light comprising: means for collecting solar energy and converting it to electrical energy; means for receiving and storing said electrical energy, output means including a light for utilizing said electrical energy operable in response to a motion detection means sensing motion, and means for conditioning the response of said output means in response to sensed ambient conditions.

2. A solar powered proximity triggered light according to claim 1 wherein: said means for collecting solar energy and converting it to electrical energy comprises a solar cell.

3. A solar powered proximity triggered light according to claim 1 wherein: said means for receiving and storing said electrical energy comprises a battery.

4. A solar powered proximity triggered light according to claim 1 wherein: said output means for utilizing said electrical energy further includes a transmitter means for initiating further response in response to said motion detector means sensing motion.

5. A solar powered proximity triggered light according to claim 1 wherein: said means for sensing motion comprises an infrared motion detection device.

6. A solar powered proximity triggered light according to claim 1 wherein: said means for sensing ambient condition include a photocell for sensing the lack of ambient light as a condition for operating said output means to light a light.

7. A solar powered proximity triggered light according to claim 1 further comprising: means for detecting the state of energy storage.

8. A solar powered proximity triggered light according to claim 7 wherein: said means for detecting the state of energy stored detects low battery storage and in a priority sequence reduces or eliminates light output in favor of operation of said transmitter means as a signal device.

* * * * *